June 18, 1963 W. F. BERCK 3,094,004
VALVE CONTROL MECHANISM
Filed Aug. 11, 1961 3 Sheets-Sheet 3
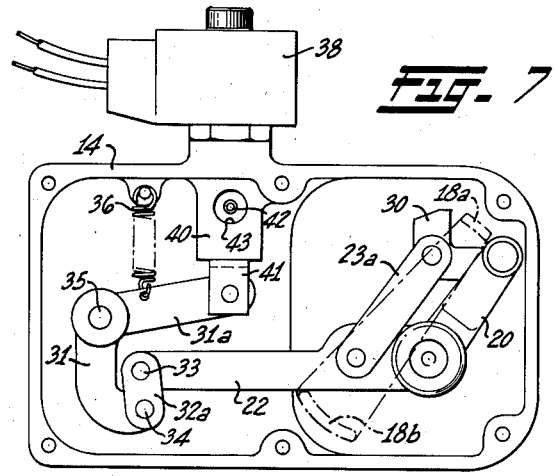
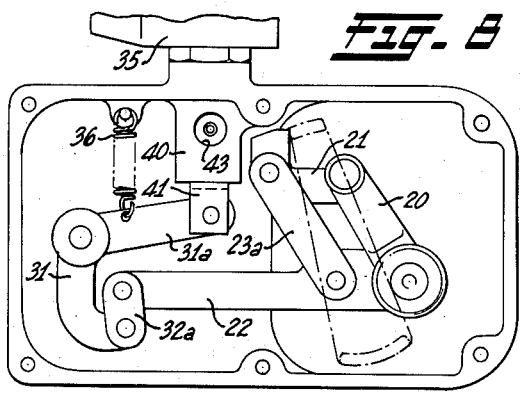
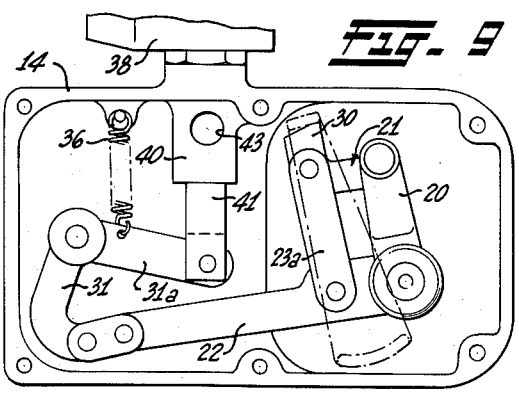
INVENTOR:
WILLIAM F. BERCK
BY
Mellin and Hanscom
ATTORNEYS United States Patent Office 3,094,004
Patented June 18, 1963

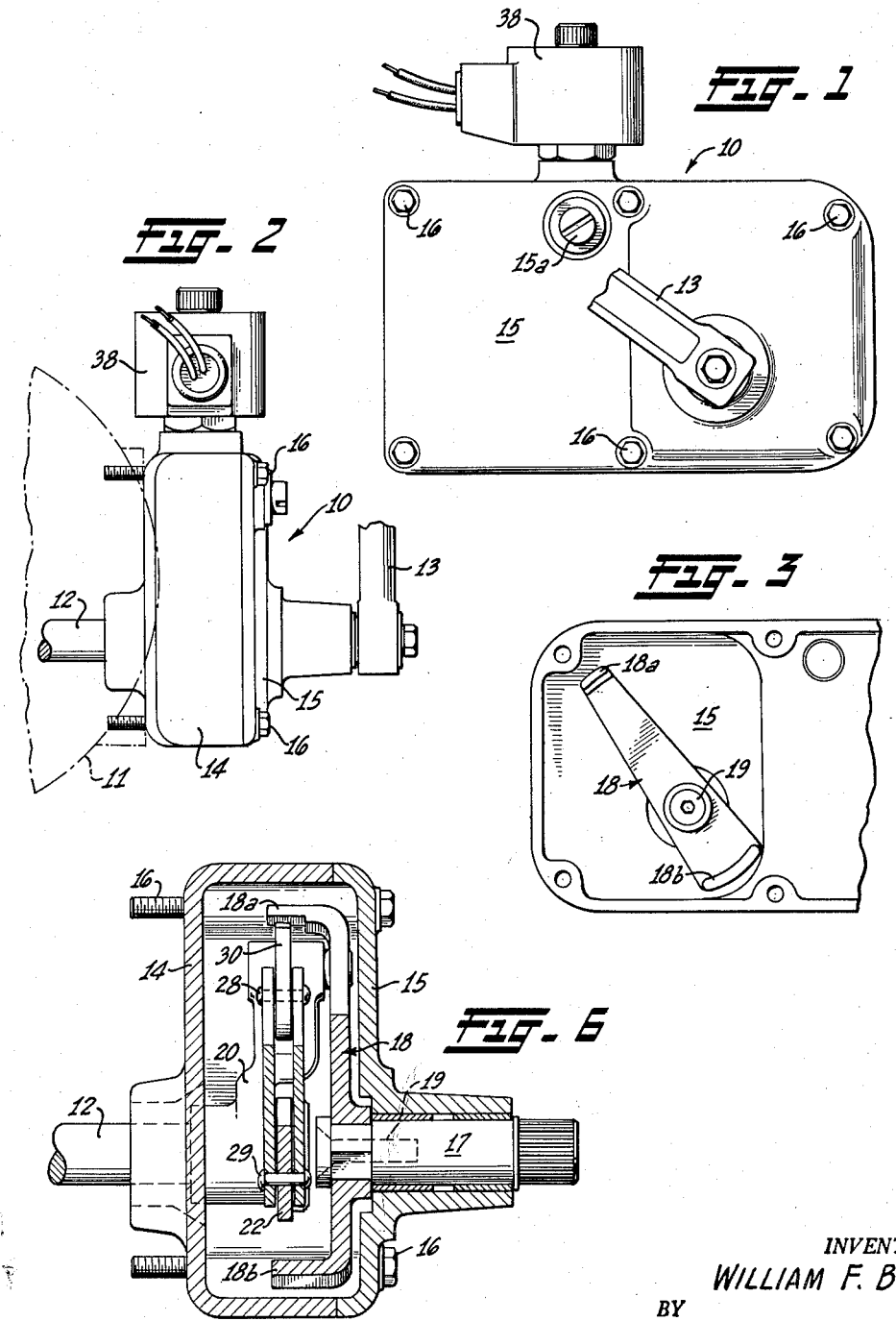

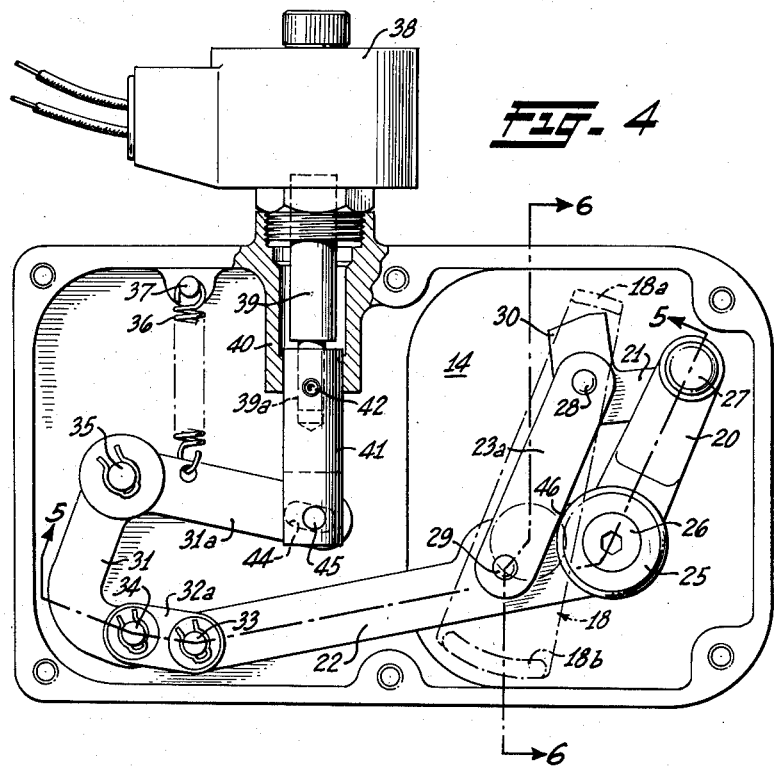
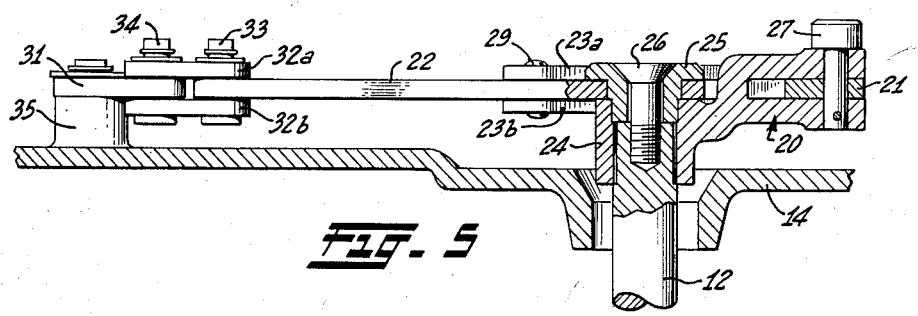

3,094,004
VALVE CONTROL MECHANISM
William F. Berck, Hayward, Calif., assignor to Ralph N. Brodie Company, San Leandro, Calif., a corporation of California
Filed Aug. 11, 1961, Ser. No. 130,958
12 Claims. (Cl. 74—2)

This invention relates to actuating and control mechanisms for valve devices, and more particularly involves a novel control interlock for a valve, insuring that certain operating conditions are fulfilled before the valve can be opened.

Briefly, this invention contemplates an actuating and control mechanism comprising a linkage arrangement including an arm connected to a valve element of a self-closing type valve and further including a catch member. An electrically operated means is provided for retaining the linkage in a position where said catch member will be engaged by an operating member so that, upon actuation of the operating member, the valve element may be opened through movement of the arm. In a preferred embodiment of the invention as shown in the drawings and hereinafter described, unless electrically operated means is energized, the catch member cannot be engaged by the operating member; and the valve, therefore, cannot be opened or retained in an open condition.

The invention contemplated has many important and useful applications. For example, it might be used as a safety control device in loading and transporting volatile liquids. Since normal rules of safety require that transport vehicles be grounded before loading operations begin, certain devices are now employed which send out an electrical signal when the vehicle has been grounded for energizing a pump or a valve control circuit. It will become evident that such a signal might also be used for operating the electrically operated means of the present invention, thereby controlling the position of a valve control linkage which, in turn, determines whether the valve may be opened.

The present invention in valve control mechanisms is of additional importance in providing a control that may be remotely operated. As an example, the loading of a number of transports may be supervised by an individual or controller stationed some distance from the loading point. The several valves of each transport may be conditioned from the controller's station, then manually opened by an operator. If, at any time during the loading, the controller wishes to stop fluid flow through any one of the valves, he need only break an electrical circuit to that valve, thereby tripping the valve and allowing it to close; and even though an operator may attempt to hold the valve open.

By way of further example, this invention might also be utilized in an unattended fluid delivery station where the valve may be conditioned by key operated switches. Each person authorized to operate the valve would then be provided with a key, and the valve could not be opened until the electrical interlock would have been energized.

In view of the above explanation, and especially in view of the following detailed disclosure, a primary object of this invention is to provide a novel form of control device for valves having an electrical interlock, allowing the valve to be opened and held open under certain conditions, but inhibiting a valve opening under other conditions.

A second object is to provide a valve control mechanism that may be ruggedly built for positive operation with relatively-large sizes of valves, and with greater safety than with known prior art devices.

Another object of this invention is to provide in combination, a self-closing valve having a valve element and means for moving said element from an open to a closed position, a valve control mechanism including a catch member and means operatively connecting said catch member to said valve element, said connecting means allowing said catch member to move independently of said valve element between first and second relative positions, said catch member thereby being both movable with said valve element and movable independently thereof, means for releasably retaining said catch member in said first relative position, and means engageable with said catch member when retained in said first relative position for moving said valve element to an open position, said last-named means being inoperative for moving said valve element when said catch member occupies said second relative position.

A further object is to provide an actuating and control device of the kind described, having electrically operable means controlling the position of a catch member to either permit or inhibit the opening of a self-closing type valve.

An additional object of this invention is to provide an actuating and controller device of the kind described and including a parallelogram linkage comprising a first linkage member mounted to said valve element and also including second and third members pivotally connected to said first member and to a fourth member, said second member having a catch engagement provided thereon; means for releasably retaining said third member in a first position, and means engageable with said catch engagement when said third linkage member occupies said first position for pivotally moving said first and fourth linkage members and for opening said valve, said last-named means being inoperative for moving said first linkage member when said third linkage member is moved from said first position.

Other objects of this invention will become apparent in view of the drawings and the following detailed description.

In the drawings forming a part of this application and in which like parts are identified by like reference numerals throughout the same, FIG. 1 is a side view of a preferred embodiment of a control mechanism for valves constructed in accordance with the practice of this invention;

FIG. 2 is an end view of the preferred embodiment;

FIG. 3 is a partial plan view of the inside of the cover plate with actuating arm;

FIG. 4 is a side view of the preferred embodiment having its cover plate removed, a portion of the housing being shown in section;

FIG. 5 is an extended cross section of certain parts of the control mechanism, taken on lines 5—5 of FIG. 4;

FIG. 6 is a section taken on lines 6—6 of FIG. 4;

FIGS. 7–9 are substantially side views of the preferred embodiment, having the cover plate removed and illustrating various conditions of operation and positions of the control elements.

Referring to FIGS. 1 and 2 in particular, there is shown a preferred embodiment of valve control mechanism 10 mounted upon a valve 11 of conventional construction. Valve 11 is of a self-closing type having a valve element pivotally supported and keyed to an operating shaft 12. Inasmuch as details of the valve do not form a part of this invention and are, in fact, conventional, they are not shown.

In the normal operation of a valve such as 11, its valve element is manually operated to an open position by a crank member directly mounted to shaft 12. However, the present invention provides a crank member 13 as part of the valve control mechanism 10. It will become apparent that crank member 13, similar to prior art crank members, but under certain conditions only, may be manually or mechanically operated for opening and retaining the valve element of valve 11 in an open position.

Valve control mechanism 10 comprises a housing, including a base portion 14 and a cover 15. A plurality of through bolts 16 are utilized for mounting the cover to the base portion and also for mounting the entire control mechanism 10 to the valve body of valve 11.

FIGS. 3 and 6 of the drawings best illustrate the mounting of crank arm 13, which is keyed to shaft 17, having a splined outer end and supported in a sleeve portion of the cover 15. A control arm 18 is keyed to the inner squared end of shaft 17 and held thereto by a screw 19, as shown, said arm having a catch-engaging lip 18a and an arm-engaging lip 18b. The operation and functions of control arm 28 and lip portions 18a—18b will be explained following a complete description of cooperating elements.

Referring to FIGS. 4–6 control mechanism 10 more especially comprises a parallelogram linkage including an arm member 20, a catch arm 21, and operating arm 22, and a pair of superposed links 23a and 23b. Arm member 20 is formed with a splined sleeve 24, keyed to shaft 12 for pivotal movement with the valve element of valve 11. Member 20 is retained in keyed relationship with shaft 12 by the shoulder of an end bushing 25 which is secured to the end of shaft 12 by a screw 26. Bushing 25 further provides a cylindrical bearing surface around which operating arm 22 can pivot. Arm 20 is also bifurcated at the end opposite from the sleeve portion 24, and catch arm 21 being received between this bifurcation, is pivotally connected thereto by a pin 27. Links 23a and 23b are pinned together and pivotally interconnect catch arm 21 and operating arm 22 by pin members 28 and 29. Catch arm 21 is integrally formed with a projecting catch 30, and it will become evident that an engagement with said catch by lip 18a will serve to move the parallelogram linkage into a valve opening position.

The parallelogram linkage described may be pivoted upon the axis of shaft 12 by movement of operating arm 22. For this purpose, arm 22 is pivotally connected with a bell crank 31 by a pair of links 32a and 32b, said links being joined by pins 33 and 34; and the jointed connection provided by links 32a and 32b transmits a clockwise or counter clockwise torque to arm 22, depending upon the position of the parallelogram linkage. Bell crank 31 is pivotally mounted from base portion 14 upon a post 35, and is pivotally biased by a spring member 36, secured both to a post 37 and to an opening in arm portion 31a of said bell crank.

A bottoming type solenoid 38 of conventional design is rigidly mounted to base portion 14, said solenoid having a reciprocally mounted core 39 projecting through a mounting sleeve 40 of the base portion 14. Core 39 is formed with a tenon 39a which slidably fits into a connecting sleeve 41 to which it may be adjustably secured by a set screw 42. An opening 43 provided in mounting sleeve 40 permits access to screw 42 when core 39 is bottomed in the solenoid, thus providing means for adjusting the connection between the core and the connecting sleeve 41. FIG. 1 further shows a plug 15a that may be removed from cover 15 to expose opening 43 and set screw 42 without requiring a removal of the cover.

Sleeve 41 is diametrically slotted for receiving arm portion 31a of the bell crank; and an elongated opening 44, formed in the arm portion 31a, permits a pivotal connection to be made therebetween with a pin 45.

Parenthetically, it is to be noted that spring 36 tends to urge core 39 upward until it is bottomed in the solenoid. Inasmuch as solenoids of this type develop their greatest holding power when the core members are bottomed, and since solenoid 38 is not used to actually pull its core any distance but only to hold the core in a bottom position, the mechanism described may be operated with a comparatively small solenoid, although the controlled valve 11 may be relatively large.

Assuming an operable connection with a self-closing type valve 11, shaft 12 will be rotatably urged by the valve toward a valve-closed position, arm 20 and the parallelogram linkage being positioned accordingly. Unless arm 20 is rotated against the closing force of the valve, it will occupy a position as shown in FIG. 4, which further illustrates the initial positions and relationships of all parts with solenoid 38 de-energized.

Referring to FIG. 4, spring 36 tends to pivot bell crank 31 in a counter clockwise direction, and a downward force is applied through links 32a and 32b to the operating arm 22, said arm having a limited position determined by the valve-controlled position of arm 20 and a binding engagement between link 23a and the peripheral surface of bushing 25, such as indicated at point 46. In order to condition control mechanism 10 for opening valve 11, it is necessary to energize solenoid 38 and then rotate crank 13 in a clockwise direction, as shown in FIG. 1. This will move control arm 18 clockwise also and place lip portion 18b into an engagement with arm 22, causing said arm, bell crank 31, links 32a—32b, and the parallelogram linkage to assume positions shown in FIG. 7, with core 39 bottomed in the solenoid 38. Links 32a—32b now apply an upwardly directed force to arm 22. Catch 30, it will be noted, is now positioned and held in the path of lip portion 18a, and a reverse or counter clockwise movement of crank 13 will bring these members into an engagement. As control arm 18 is rotated, arm 21 will be moved toward the left, rotating arm 20 counter clockwise and moving valve 11 through shaft 12 to an open position.

From the above description, it will be evident that links 32a and 32b act as a toggle connection between crank 31 and operating arm 22. The pivot axis of pin 34 may be considered the knee of the toggle to which a counter-clockwise directional force is applied by the bias of spring 36. In a mechanism of this kind, the direction of the applied force is normal to the line through the pivot axes of pins 34 and 35. Accordingly, when arm 22 is tripped to its lowermost position, as shown in FIG. 4, the force of spring 36 tends to rotate links 32a and 32b clockwise about the axis of pin 33, thereby tending to move arm 22 downwardly. A binding engagement is then made between link 23a and the peripheral surface of bushing 25, such as indicated at point 46.

During the process of opening valve 11 by means of the crank 13, solenoid 38 and spring 36 will hold the parallelogram linkage against the closing force of the valve (which tends to move catch 30 against lip portion 18b). The valve-closing forces, it will be noted, apply a clockwise torque to arm 21 with a resulting downward force being applied to operating arm 22, thereby tending to rotate arm 22 counter clockwise about the bushing 25. Inasmuch as arm 21 is held upwardly by the combined forces of spring 30 and solenoid 38, said forces being transmitted through bell crank 31 and links 32a—32b, movement of arm 22 is restrained.

By the time catch 30 and arms 20 and 21 have been moved into the positional relationship shown in FIG. 8, valve 11 will have been fully opened. The valve is then retained in this state of openness by manual or mechanical holding of crank 13.

Now, assuming that solenoid 38 is subsequently de-energized, the hold-back force provided thereby will be lost. Since spring 36 is selected with a force potential insufficient for opposing the natural closing force of valve 11 as applied through bell crank 31 and links 32a—32b to arm 22, said arm will be moved downwardly, allowing catch 30 to pass beneath lip portion 18a, as shown in FIG. 9. Obviously, although crank 13 with control arm 18 is secured or manually held, valve 11 will be operated to a closed condition by its self-closing design; and the parallelogram linkage will be moved into the positional relationship of FIG. 4.

It will be evident that if bell crank 31, links 32a—32b, and arm 22 were connected so that the pivot axes of pins 33, 34 and 35 were in a straight line while solenoid 38 was energized, there would be a complete locking action of parts. This is true, since the transmission of closing forces from arm 22 to links 32a—32b and bell crank 31 would then be directed through their respective pivot supports; hence, there would be no counter torque applied to the bell crank. By proper adjustment of the connection between core 39 and sleeve 41, the position of bell crank 31 may be regulated so as to eliminate such a locking condition. Furthermore, an adjustment of this core-sleeve connection may be used to vary the mechanical advantage given to the solenoid, thereby providing a secure holding action while the solenoid is energized but allowing the bell crank to be pivoted clockwise by the valve-closing force transmitted to arm 22 when solenoid 38 is de-energized.

It is to be understood that the particular embodiment shown and described is to be taken as a preferred example of this invention, and although various changes may be made without departing from the spirit of this invention or the scope of the attached claims, each of such changes is contemplated.

Having thus described my invention, what I claim and desire to secure by Letters Patent is:

1. An actuating and control mechanism comprising: a parallelogram linkage having a pivotally mounted first linkage member and including second and third parallel members pivotally connected to said first member and to a fourth member, said second member having a catch engagement provided thereon; means for releasably retaining said third member in a first position; means for pivotally biasing said first linkage; and means engageable with said catch engagement when said third linkage member occupies said first position for pivotally moving said first linkage member against said biasing means, said last named means being inoperative for moving said first linkage member when said third linkage member is moved from said first position.

2. The apparatus of claim 1 wherein said means for releasably retaining said third linkage member in a first position comprises an electric solenoid and a spring member, said spring member constantly urging said third linkage member toward said first position and whereby energization of said solenoid will hold said third linkage member in said first position.

3. The apparatus of claim 1 wherein said means for releasably retaining said third linkage member in a first position includes an electric solenoid and a linkage connection, whereby energization of said solenoid will hold said linkage connection in a preset position.

4. The apparatus of claim 3 wherein said means for releasably retaining said third linkage member further includes a spring member connected to said linkage connection in aid of said solenoid, said spring member constantly urging said linkage connection toward its preset position.

5. The apparatus of claim 3 wherein said solenoid and linkage connection are adjustably connected, whereby the position of said linkage connection may be varied when the solenoid core is bottomed to impose a greater or lesser retaining power over said third linkage member.

6. The apparatus of claim 1 wherein said means engageable with said catch engagement comprises a pivotally mounted actuating arm having a first lip member engageable with said catch member and a second lip member engageable with said third member for moving said member into said first position.

7. The apparatus of claim 1 wherein said means for releasably retaining said third linkage member in a first position includes an electric solenoid and a linkage connection, whereby energization of said solenoid will hold said linkage connection in a preset position and retain said third linkage member in said first position, and further wherein said means engageable with said catch engagement comprises a pivotally mounted actuating arm having a first lip member engageable with said catch member and a second lip member engageable with said third linkage member for moving said member into said first position.

8. The apparatus of claim 7 wherein said means for releasably retaining said third linkage member in a first position further comprises a spring member connected to said linkage connection in aid of said solenoid, said spring member constantly urging said linkage connection toward its preset position.

9. The apparatus of claim 1 wherein said first and second linkage members are pivotally connected upon the pivotal mounting axis of said first linkage.

10. An actuating and control mechanism comprising: a parallelogram linkage having a pivotally mounted first linkage member and including second and third parallel members pivotally connected to said first member and to a fourth member, said second member having a catch engagement provided thereon; a pivotally mounted crank arm, a link member pivotally connected to said crank arm and to said third member, means connected to said crank arm for releasably retaining said third member in a first position; means for pivotally biasing said first linkage; and means engageable with said catch engagement when said third linkage occupies said first position for pivotally moving said first linkage member against said biasing means, said last named means being inoperative for moving said first linkage member when said third linkage member is moved from said first position.

11. The apparatus of claim 10 wherein the pivotal connection of said crank arm and link member is more distant from the pivot axis of said crank arm than is the pivoted connection of said link member and third member when said third member is in a first position.

12. The apparatus of claim 10 wherein said retaining means comprises a solenoid and a spring member, said spring member being in aid of said solenoid and constantly urging said crank and link member toward preset positions.

References Cited in the file of this patent

UNITED STATES PATENTS

| | | |
|---|---|---|
| 2,301,876 | Hurlburt | Nov. 10, 1942 |
| 2,875,616 | Marks | Mar. 3, 1959 |